US012644777B2

(12) United States Patent
Fortunato et al.

(10) Patent No.: US 12,644,777 B2
(45) Date of Patent: Jun. 2, 2026

(54) PROTECTIVE TUBE WITH REDUCED SENSITIVITY TO VORTEX INDUCED VIBRATIONS

(71) Applicant: Endress+Hauser Wetzer GmbH+Co. KG, Nesselwang (DE)

(72) Inventors: Gianluca Fortunato, Milan (IT); Michele Pietroni, S.Donato (IT); Davide Eralti, Vedano Al Lambro (IT)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 427 days.

(21) Appl. No.: 18/173,895

(22) Filed: Feb. 24, 2023

(65) Prior Publication Data

US 2023/0266173 A1     Aug. 24, 2023

(30) Foreign Application Priority Data

Feb. 24, 2022    (EP) ..................................... 22158523

(51) Int. Cl.
*G01K 1/08* (2021.01)
*G01K 1/14* (2021.01)
*G01K 13/02* (2021.01)

(52) U.S. Cl.
CPC ................. *G01K 1/08* (2013.01); *G01K 1/14* (2013.01); *G01K 13/02* (2013.01)

(58) Field of Classification Search
CPC ............. G01K 1/08; G01K 1/14; G01K 13/02
USPC ................................................. 374/208, 148
See application file for complete search history.

(56) References Cited

U.S. PATENT DOCUMENTS

| | | | |
|---|---|---|---|
| 3,076,533 A | 2/1963 | Scruton et al. | |
| 4,991,976 A | 2/1991 | Byles | |
| 7,424,396 B2 | 9/2008 | Dodeja et al. | |
| 7,836,780 B2 | 11/2010 | Garnett et al. | |
| 8,770,894 B1 | 7/2014 | Allen et al. | |
| 2009/0211368 A1* | 8/2009 | Garnett ..................... G01F 1/46 73/861.65 |
| 2013/0014221 A1 | 1/2013 | Moore et al. | |
| 2018/0031397 A1* | 2/2018 | Al Faihan ............ G01D 11/245 |
| 2022/0268610 A1* | 8/2022 | van der Heide ......... G01K 7/22 |

FOREIGN PATENT DOCUMENTS

| | | | |
|---|---|---|---|
| CN | 101960264 A1 | 1/2011 | |
| CN | 109556744 A * | 4/2019 | ............... G01K 1/18 |
| CN | 112585440 A1 | 3/2021 | |
| EP | 3967994 A1 | 3/2022 | |

(Continued)

*Primary Examiner* — Mirellys Jagan
(74) *Attorney, Agent, or Firm* — Christopher R. Powers; Endress+Hauser (USA) Holding, Inc.

(57) ABSTRACT

The present disclosure includes a protective tube for insertion into a pipe or vessel containing a medium, a measuring apparatus having such protective tube and to a method for producing the protective tube. The protective tube comprises a tubular member having a bore extending between an upper and lower end of the tubular member, and at least one helical fin formed on at least a section of an outer surface of the tubular member, winding around the outer surface of the tubular member and defining a flow channel along at least a part of the tubular member. An outer surface of the tubular member comprises a surface structure in an area of the at least one flow channel.

10 Claims, 4 Drawing Sheets

(56) References Cited

FOREIGN PATENT DOCUMENTS

| EP | 4027123 | A1 | | 7/2022 | |
|----|---------|----|----|--------|--------|
| GB | 2433122 | A | * | 6/2007 | .............. G01K 1/08 |
| GB | 2442488 | A1 | | 4/2008 | |
| JP | 4102034 | U | | 9/1992 | |
| WO | 2020035402 | A1 | | 2/2020 | |

* cited by examiner

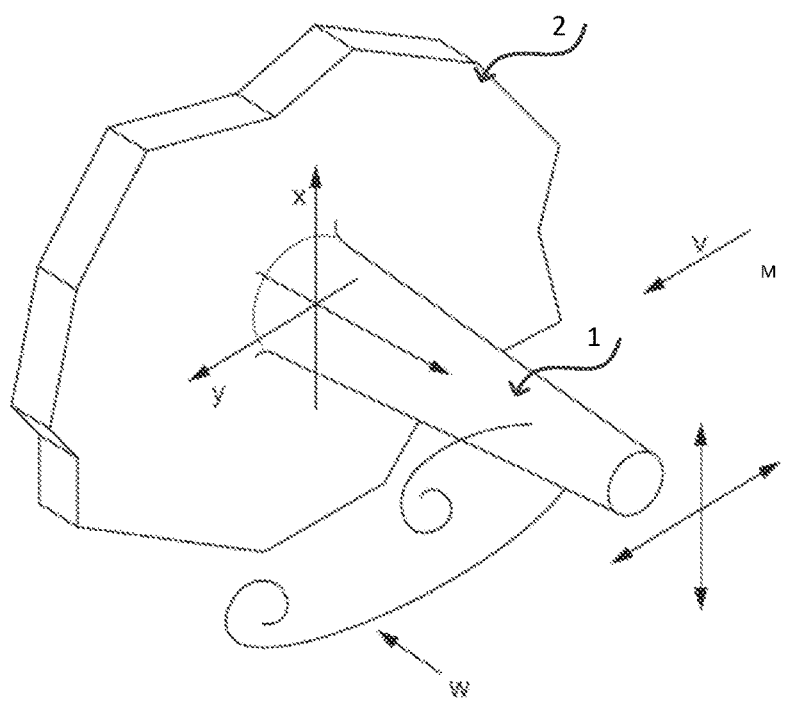
Fig. 1
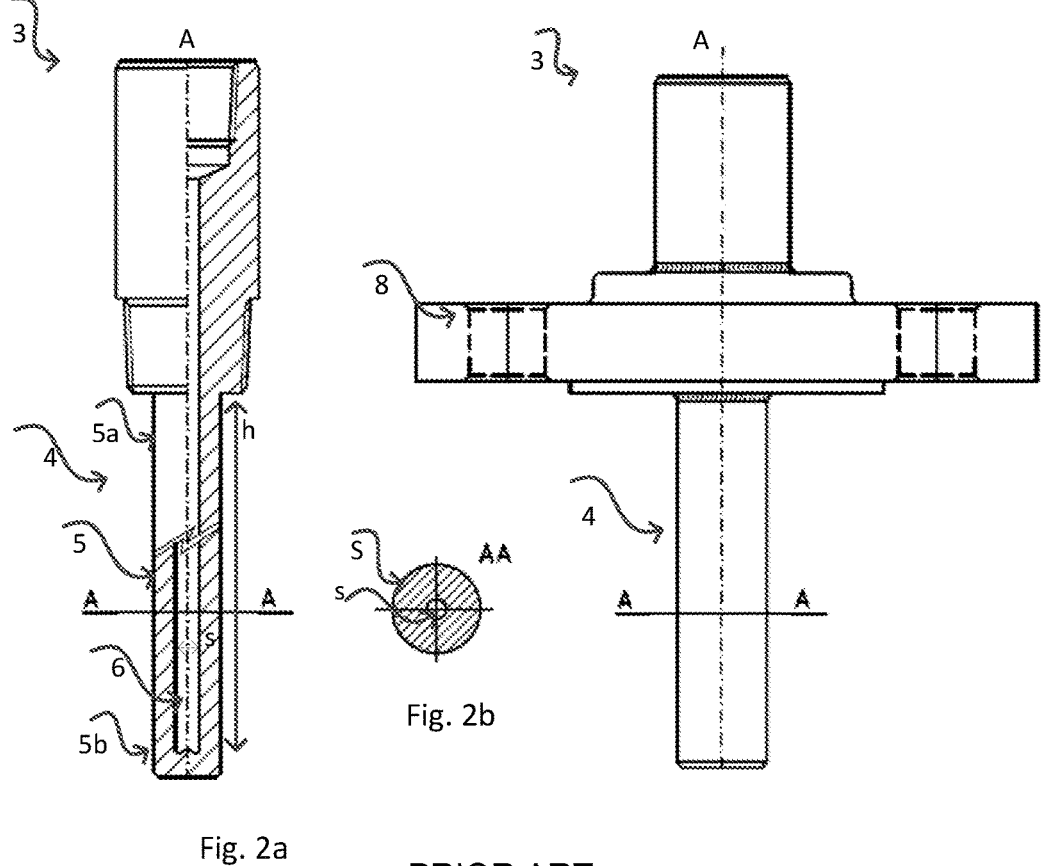
Fig. 2a
Fig. 2b
PRIOR ART
Fig. 2c

PROTECTIVE TUBE WITH REDUCED SENSITIVITY TO VORTEX INDUCED VIBRATIONS

The present application is related to and claims the priority benefit of European Patent Application No. 22158523.5, filed on Feb. 24, 2022, the entire contents of which are incorporated herein by reference.

TECHNICAL FIELD

The present disclosure relates to a protective tube for insertion into a pipe or vessel containing a medium, to a measuring apparatus for determining and/or monitoring a process variable of a medium comprising such protective tube, and a method of producing such protective tube.

BACKGROUND

A conventional protective tube serves for receiving a measuring insert for determining and/or monitoring a process variable of a medium. In the field of measuring inserts for determining and/or monitoring a process variable of a medium, protective tubes are, e.g., known in the form of thermowells for thermometers, which serve for determining and/or monitoring the temperature of a medium. The measuring insert of a thermometer conventionally at least includes one temperature sensor for determining and/or monitoring the temperature of the medium. Such a temperature sensor in turn includes at least one temperature-sensitive component, e.g., in the form of a resistive element, e.g., a platinum element, or in the form of a thermocouple. However, protective tubes are also known in connection with gas sampling probes, where a gas sample is, e.g., dynamically, taken out from a pipe or vessel. The present disclosure thus generally relates to fluid processing and related measurements employing insertion type probe bodies and is not restricted to thermowells or gas sampling probes.

Such protective tubes are frequently exposed to the flow of the respective medium, which causes different mechanical forces acting on the protective tube, e.g., shear forces or forces induced by coherent vortex shedding and which can result in vortex induced vibrations (VIV). Vortex shedding in fluid dynamics is known as "Kármán vortex street" and refers to a repeating pattern of swirling vortices in alternating directions caused by the unsteady separation of flow of a medium around a body, causing said body to vibrate. The closer the frequency of the vibrations is to the natural frequency of the body around which the medium flows, the more the body vibrates. The frequency of the vibrations is, e.g., determined by several process parameters, such as the physical properties of the medium, the flow velocity and the shape of the body.

Due to the high risk of damage of protective tubes subject to VIV, these vibrations, e.g., need to be duly considered during production. For example, in the case of thermometers, standard methods, such as ASME PTC 19.3 TW-2000, are available, which define several design rules that help to reduce negative effects of coherent vortex shedding. The basic principle underlying the design rules is to increase the natural frequency of vibrations of the thermometer to separate the natural frequency from the vortex shedding frequency. In such way, the dangerous condition of resonant vortex induced vibrations becomes minimized. For this purpose, commonly the geometry of the thermometer is varied, e.g., by reducing its length and/or by increasing its diameter.

Alternatively, when functional constraints do not allow certain changes in the dimensions of the thermometer, mechanical supports or absorbers are frequently used to reduce the thermometer's sensitivity to vortex shedding. These mechanical supports or absorbers are usually fitted into a gap between the opening of the vessel or pipe and the outside surface of the thermometer. The supports or absorbers then increase the natural frequency of the thermometer by reducing the free length of the thermometer. However, it proves difficult to fit the supports or absorbers in such a way that a high level of coupling and therefore the desired effect can be achieved.

Yet, another approach to reduce VIV of protective tubes is to provide certain structures or structural elements on the protective tube. In this context, helical fins on the outer surface of the protective tube have been proven very successful as, e.g., described in U.S. Pat. Nos. 3,076,533A, 4,991,976, 7,424,396B2, 653,931B1, 7,836,780B2, US2013/0142216A1, GB2442488A, or WO2020/035402A1 for different configurations.

SUMMARY

In view of such known approaches, the objective technical problem underlying the present disclosure is to increase the resistance of protective tubes against vortex induced vibrations.

This problem is solved by means of a protective tube, a measuring apparatus and a method according to the present disclosure.

Regarding the protective tube, the objective technical problem is solved by means of a protective tube for insertion into a pipe or vessel containing a medium, the protective tube comprising: a tubular member having a bore extending between an upper and lower end of the tubular member; and at least one helical fin formed on at least a section of an outer surface of the tubular member, winding around the outer surface of the tubular member and defining a flow channel along at least a part of the tubular member.

According to the present disclosure, an outer surface of the tubular member in an area of the at least one flow channel comprises a surface structure.

The protective tube is often mounted on the pipe or vessel via an opening, which may have a process connection for connecting the protective tube to the vessel or pipe. The protective tube at least partially extends into an inner volume of the vessel or pipe and is at least partially in contact with the flowing medium. The protective tube may be arranged such that its longitudinal axis proceeds perpendicular to the flow direction of the medium. However, also, angles between the longitudinal axis and the flow direction different from 90° can be employed.

The at least one, e.g., at least two or at least three, helical fins improve the stability of the protective tube towards coherent vortex shedding. A further improvement is achieved by means of the surface structure provided within the at least one flow channel. The surface structure serves for a laminarization of the flow profile in the at least one flow channel.

In at least one embodiment of the protective tube, the surface structure comprises a surface corrugation.

In a further embodiment the surface structure comprises wherein the surface structure comprises a pattern, contour or profile, with alternating depressions and elevations, e.g., a pattern winding around the outer surface of the tubular member along at least a part of the tubular member. The elevations may have rounded or sharp edges and can be embodied so as to be round or flat in an area of maximal height of the elevation.

The protective tube can be used in a wide range of applications and can, e.g., be part of a gas sampling probe with an inlet and outlet end or a Pitot tube. However, in one embodiment the the protective tube is a thermowell, and the tubular member is closed in one end section.

Another embodiment comprises that at least one geometrical parameter of the at least one helical fin is chosen such that it depends on at least one process condition of the medium in the vessel or pipe. In this manner, a protective tube with at least one customized helical fin, which is chosen in dependence of the specific applied process, is provided. As a consequence the stability of the protective tube towards coherent vortex shedding can be further optimized. Several embodiments exist for providing a customized thermowell according to the present disclosure, which are described in European patent application EP3967994A1, the entire contents of which are incorporated herein by reference.

The objective technical problem is also solved by means of a measuring apparatus for determining and/or monitoring a process variable of a medium, comprising a protective tube according to any of the embodiments described in connection with the protective tube. In one embodiment of the measuring apparatus, the protective tube serves for receiving a measuring insert for determining and/or monitoring a process variable of a medium, e.g., the temperature of a medium.

Finally, the objective technical problem is solved by means of a method of producing a protective tube for insertion into a pipe or vessel containing a medium, the protective tube comprising: a tubular member having a bore extending between an upper and lower end of the tubular member; and at least one helical fin formed on at least a section of an outer surface of the tubular member and winding around the outer surface of the tubular member.

The method comprises the step of providing a surface structure on an outer surface of the tubular member in the area of the at least one flow channel.

In one embodiment of the method, the method further comprises the step of choosing at least one geometrical parameter of the at least one helical fin such that it depends on at least one process condition of the medium in the vessel or pipe. In this regard, again reference in full is made to the published European patent application EP3967994A1.

It is further of advantage if at least one parameter of the surface structure is chosen such that it depends on at least one process condition of the medium in the vessel or pipe. For instance, a number of valleys and/or elevations, e.g., a number per flow channel, a height of the valleys and/or elevation and/or a shape of the valleys and/or elevations can be chosen. The geometrical parameter relating to the surface structure can further be constant throughout the surface structure or varied along at least one axis of the tubular member.

There are several possibilities to produce the entire protective tube, which all fall into the scope of the present disclosure, i.e., the protective tube, measuring apparatus and method.

For instance, the protective tube may be manufactured starting from a cylindrical tubular member which is subsequently machined in order to achieve a protective tube according to the present disclosure. The tubular member may be provided with a central bore. Furthermore, the helical fins can, e.g., either be produced by removing parts of the wall of the tubular member in order to form the at least one flow channel. Alternatively, the production may include arranging the at least one helical fin on an outer surface of the tubular member, e.g., by welding a preformed element of the protective tube's outer surface as described in published European patent application EP4027123A1 to which reference in full is made as well.

Alternatively, the protective tube according to the present disclosure may also be produced by an additive manufacturing procedure, e.g., by a 3D printing procedure, by a casting process or by means of a molding process.

Similarly, the surface structure can be either produced together with the at least one flow channel and helical fin or in a separate production step before or after providing the at least one flow channel and helical fin. For instance, the surface structure can be either produced while the parts to form the at least one flow channel and helical fin are removed or in a separate production step afterwards. Similarly, in case the helical fin is arranged on an outer surface by providing a separate element, e.g. a preformed element, the surface structure can be provided before or after arranging the helical fin on the outer surface of the protective tube. On the other hand, when employing an additive manufacturing procedure, e.g., by a 3D printing procedure, by a casting process or by means of a molding process, the at least one flow channel, helical fin and the surface structure can also be produced in one step.

In at least one embodiment of the method comprises that the surface structure is manufactured by removing parts of the wall of the tubular member, e.g., by means of at least one turning or milling process. As outlined before, the turning or milling process may simultaneously serve to produce the at least one flow channel and helical fin.

With respect to the method according to the present disclosure, it is of advantage if at least one cutting tool is used to produce the surface structure. The cutting tool preferably is applicable in connection with a turning or milling process.

With regards to the cutting tool, it is of advantage if the cutting tool comprises a cylindric base body with at least two knives arranged on the base body, which are circumferentially distributed across an outer surface of the base body.

It is further of advantage if the surface structure is manufactured by at least at times modifying at least one manufacture-parameter, for example, by modifying a draft angle used to position the cutting tool in relation to the tubular member and/or the cutting tool used. In this regard it is preferred, if the surface structure is produced while manufacturing the at least one flow channel and helical fin, e.g., by removing part of the wall of the tubular member.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein:

FIG. 1 illustrates the origin of vortex shedding for an insertion body exposed to a flowing medium;

FIG. 2a shows a partial longitudinal cross-section of a thermometer having a state of the art thermowell;

FIG. 2b shows a radial cross-section of the thermometer of FIG. 2a;

FIG. 2c shows a side view of the thermometer of FIG. 2a with a process connection;

In the figures, the same elements are always provided with the same reference symbols.

DETAILED DESCRIPTION

Figure 3:
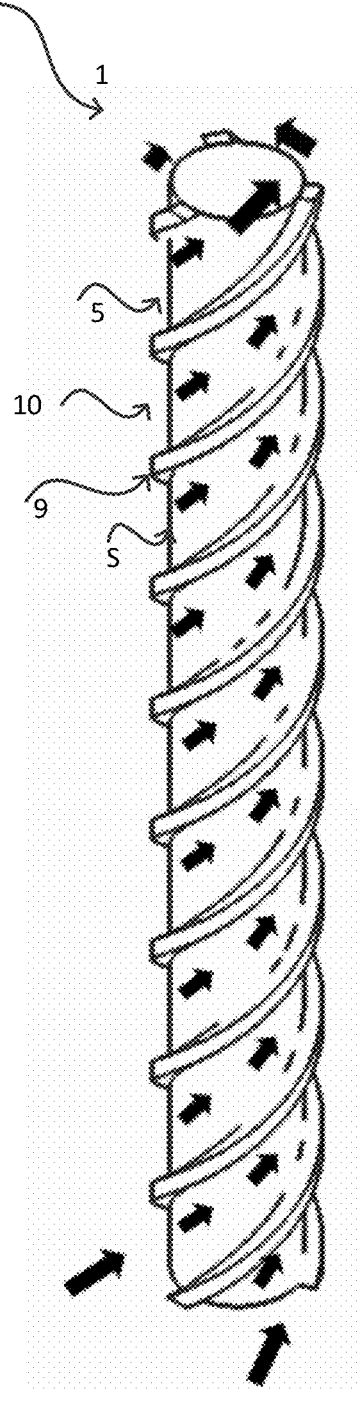
FIG. 3 shows a thermowell with a plurality of helical fins according to the state of the art.

FIG. 1 illustrates the origin of vortex shedding w at a cylindrical, conically tapered protective tube 1 exposed to a flowing medium M in a pipe 2, which is indicated by one of its walls. Downstream of the protective tube 1 in the flow direction v of the medium, a ridge-like pattern develops. Depending on the flow velocity v of the medium M, this can lead to coherent vortex shedding which in turn may cause the protective tube 1 to vibrate.

The vibrations are mainly due to two forces acting on the protective tube 1, a shear force in the in y-direction and a lifting force in x-direction. The shear force causes oscillations at a frequency $f_s$, while the lifting force causes oscillates at a frequency of $2f_s$. The frequency $f_s$ now depends on the flow velocity v of the medium M, and on various physical or chemical medium properties such as its viscosity and density, as well as on the dimensions of the protective tube 1, such as its diameter and length. The closer the frequency $f_s$ is to the natural frequency of the protective tube 1 and the higher the flow velocity v of the medium M, the greater are the resulting oscillation causing forces.

As a result of the vibration causing forces, the protective tube 1 can be damaged or even break down completely. This is known as the so-called resonance condition.

FIGS. 2a-2c exemplarily and without limitation to such embodiment show a state of the art thermometer 3 having a protective tube 1 in the form of a thermowell 4. As can be seen in FIG. 2a, the thermowell 4 comprises a tubular member 5 having a first end section 5a, and a second end section 5b with a closed end. The tubular member 5 further comprises a bore 6 forming a hollow space within the tubular member 5, which is defined by an inner surface s and a predeterminable height h parallel to a longitudinal axis A of the tubular member 5, which bore 6 serves for receiving a measuring insert 7 [not shown] for determining and/or monitoring the process variable, e.g. the temperature of the medium M.

Further, as illustrated in FIG. 2c, a fastening unit 8 is provided, which exemplarily is attached to the tubular member 5, here. This fastening unit 8 is a process connection and serves for mounting the thermowell 4 to the pipe 2 [not shown] such that the tubular member 5 at least partially extends into an inner volume of pipe 2 and such that it is at least partially in contact with the flowing medium M.

The outer surface S the thermowell 4 has an essentially round shape as becomes visible in FIG. 2b. However, such construction can easily lead to undesired vortex induced vibrations of the thermometer 3.

To overcome the problems associated with coherent vortex shedding, protective tubes 1 with helical fins 9 which are typically arranged on the outer cross-sectional surface S of the protective tube 3 have been suggested. An exemplarily protective tube 3 having three such helical fins 9 is shown in FIG. 3. The helical fins 9 form flow channels 10 along the tubular member 5 and thus reduce VIV of the protective tube 3. Each flow channel 10 is formed by the volume between to adjacent helical fins 9 which proceed around the tubular member 5 along its length axis A.

Figures 4A, 4B, 4C:
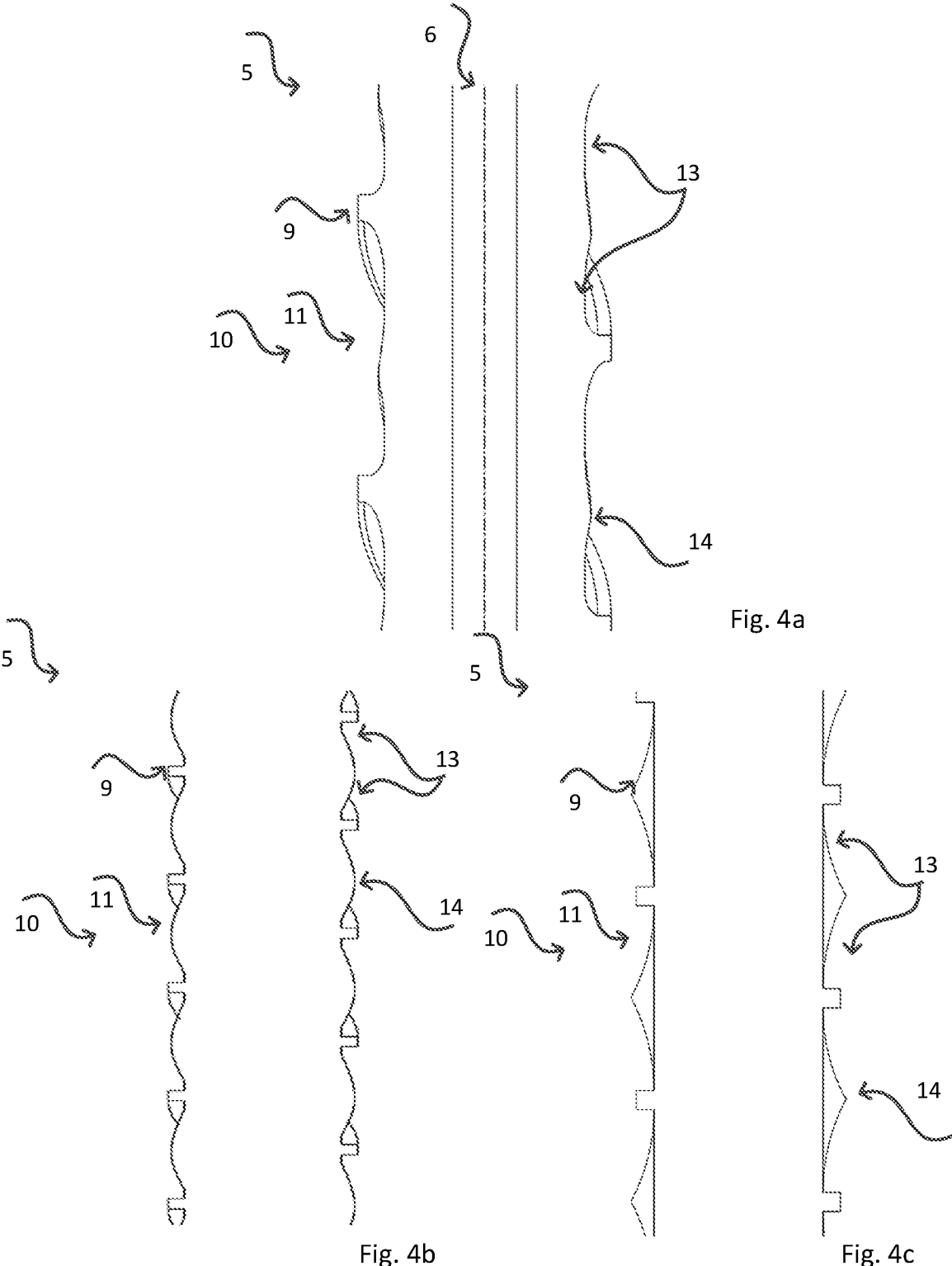
FIGS. 4a-4c show embodiments of the surface structure according to the present disclosure.

The present disclosure additionally provides a surface structure 11 for which three exemplary embodiments are shown in FIGS. 4a-4c.

FIG. 4a depicts a cross-sectional view of tubular member 5 with helical fins 9 forming flow channels 10 which in turn are provided with surface structure 11 by means of which a further improvement regarding the stability of the tubular member 5, or the protective tube 1 respectively, against vortex induced vibrations is achieved. The surface structure 11, among others, has the advantage of laminarization of the flow profile within the flow channels 10.

In this 2D view, each a surface contour is visible for each flow channel 10 which is defined by the surface structure 11. Here, the pattern of the surface structure is given by two valleys 13 separated from each other by an elevation 14, the pattern winding around the tubular member 5 in the same way as the helical fins 9, i.e., in the form of helixes. There are no sharp edges in the contour of the surface structure 11 for the embodiment shown. Further, the widths of the two valleys parallel to the longitudinal axis A of the tubular member 5 from each other. However, other embodiments of the protective tube can also comprise a multitude of equally designed valleys 13. Additionally, other embodiments can include surface structures with more valleys 13 and elevations 14, the various valleys 13 and elevations 14 at least partially having same or differing dimensions. The surface structure 11 may also comprise a surface corrugation (not shown).

A second exemplary embodiment of the surface structure 11 is shown in FIG. 4b. In this embodiment, the surface structure 11 is build in a symmetric manner around elevation 14. In contrast, for the embodiment of the surface structure 11 shown in FIG. 4c the elevation 14 comprises a sharp edge. In all embodiments shown, the helical fins 9 and surface structure 11 proceed along the entire length 1 parallel to the length axis A of the tubular member 5. However, in other embodiments, also only a given section of the tubular member 5 might be covered by helical fins 9 and/or the surface structure 11.

It is preferred, if the surface structure 11 is produced while producing the flow channels 10, which in turn are preferably produced by removing parts of the wall S of the tubular member 5, e.g., by means of at least one turning or milling process. That way, the entire production process of the protective tube 1 is simplified, optimized and can be carried out based on a reduced number of manufacturing steps.

Figures 5A, 5B:
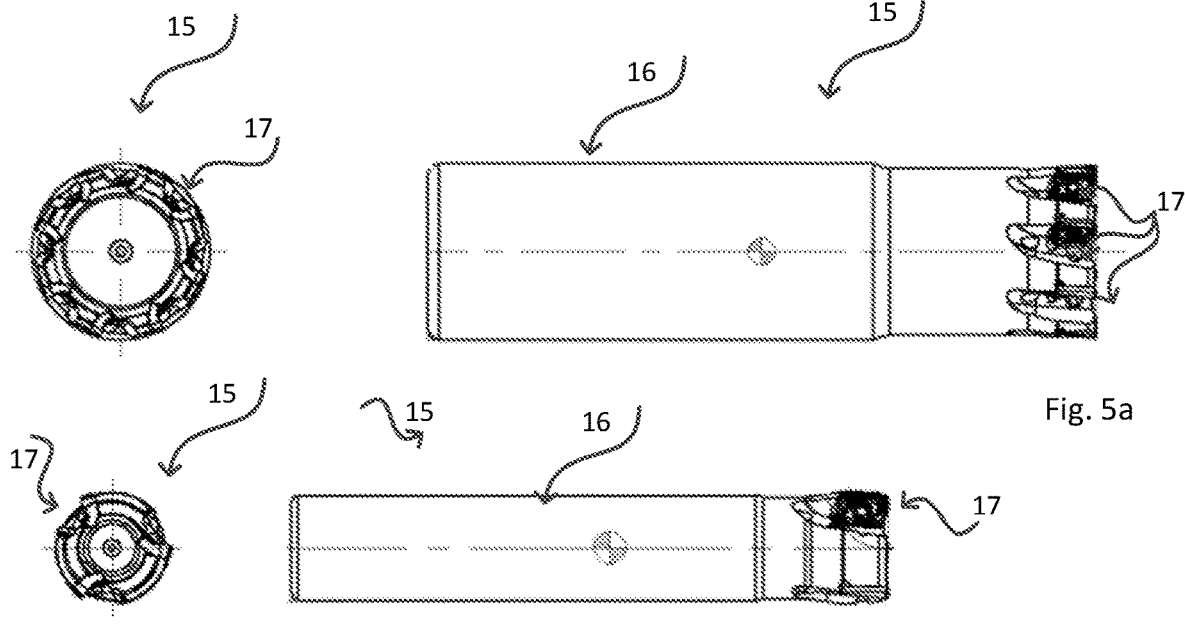
FIGS. 5a and 5b show an exemplary cutting tool to produce the surface structure according to the present disclosure.

For producing the protective tube 1 a cutting tool 15 can be utilized. FIGS. 5a and 5b depict two exemplary embodiments for a cutting tool 15 suitable to manufacture a protective tube 1 according to the present disclosure. Such cutting tool 15 preferably is applicable in connection with a turning or milling process. In both embodiments shown, the cutting tool 15 comprises a cylindric base body 16 with multiple knives 17 arranged in an end section on the base body 16. For the embodiment shown in FIG. 5a the cutting tool 15 comprises eight knives 17 and in case of the embodiment shown in FIG. 5b three knives 17. In both cases, the knives 17 are circumferentially distributed across an outer surface of the base body 16 as visible in the cross-sectional views on the left side.

The invention claimed is:

1. A protective tube for insertion into a pipe or vessel containing a medium, the protective tube comprising:

a tubular member including an outer surface and a bore extending between a proximal end and a distal end of the tubular member; and at least two helical fins formed on at least a section of the outer surface of the tubular member, winding around the outer surface of the tubular member and thereby defining at least one flow channel along at least the section of the tubular member;

wherein, in an area of the at least one flow channel, the outer surface of the tubular member comprises a surface structure in the area formed by two adjacent helical fins, which is configured for laminarization of a flow profile in the at least one flow channel; and the surface structure comprises a helical pattern with alternating valleys and elevations between the two adjacent helical fins, wherein the valleys and elevations comprise, in between the two adjacent helical fins, at least two valleys separated from each other by at least one intermediate elevation.

2. The protective tube of claim 1, wherein the helical pattern winds around the outer surface of the tubular member along at least a part of the tubular member.

3. The protective tube of claim 1, wherein the protective tube is a thermowell, and the tubular member is closed at the distal end.

4. The protective tube of claim 1, wherein at least one geometrical parameter of the at least two helical fins is chosen such that it depends on at least one process condition of the medium in the vessel or pipe.

5. The protective tube according to claim 1, wherein the elevations have a sharp edge.

6. The protective tube according to claim 1, wherein the at least two valleys are arranged such that, for each of the two adjacent helical fins, a respective valley is directly adjacent to a respective helical fin.

7. The protective tube according to claim 6, wherein the valleys and elevations between the two adjacent helical fins comprise exactly two valleys directly adjacent to the respective helical fin, which two valleys are separated from each other by exactly one intermediate elevation.

8. A measuring apparatus for determining and/or monitoring a process variable of a medium, the measuring apparatus comprising the protective tube according to claim 1.

9. The measuring apparatus according to claim 8, wherein the protective tube is configured to receive a measuring insert configured to determine and/or monitor a process variable of the medium.

10. The measuring apparatus according to claim 9, wherein the process variable of the medium is the temperature of the medium.

\* \* \* \* \*